Sept. 20, 1932.  A. G. McGREGOR  1,877,928
SMELTING OF METALLIC ORES, PARTICULARLY COPPER SULPHIDE ORES
Filed July 25, 1930
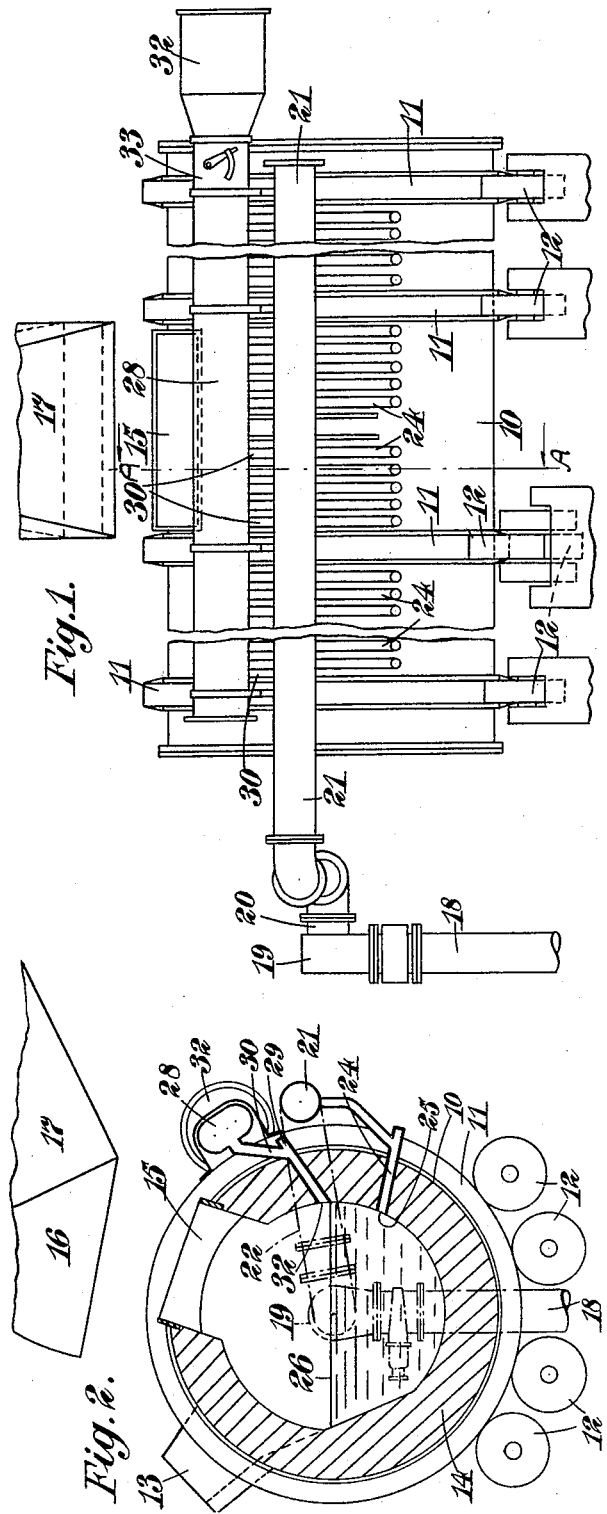

Patented Sept. 20, 1932

1,877,928

UNITED STATES PATENT OFFICE

ALEXANDER GRANT McGREGOR, OF LONDON, ENGLAND

SMELTING OF METALLIC ORES, PARTICULARLY COPPER SULPHIDE ORES

Application filed July 25, 1930. Serial No. 470,708.

This invention relates to the smelting of metallic ores. The object of the invention is to provide improved converting or bessemerizing processes and apparatus, whereby conversion is effected more rapidly than hitherto with a corresponding increase in the output per converter, the power required for the air supply to the converter is reduced, and the temperature inside the converter can be controlled with a reduction in the cost and time for repair to converter linings.

The invention is described hereinafter with specific reference to the smelting of copper sulphide ores, in which sulphur is the constituent to be removed from the molten material or matte in the converter by oxidation with the air blown thereinto, and also the iron in the matte is oxidized.

According to the present practice with tilting converters for the treatment of copper sulphide ores, air is blown into the bath of molten material or matte through tuyères at a level considerably below the level of the surface of the bath. The air bubbles up through the molten matte and keeps it in a state of violent agitation. The air pressure required to overcome the head of liquid above the tuyère discharge mouths is relatively high, being six to twelve pounds per square inch. The combustion of the sulphur in the molten matte with the oxygen in the air supply causes a rise of temperature, and the air supply may have to be stopped at intervals to avoid overheating which would damage the refractory lining of the converter or furnace.

The present invention comprises a process of converting a molten matte by blowing air into the mixture below the surface level thereof and simultaneously blowing air into the gas space above said level. The oxygen of the last-mentioned or secondary air combines with the sulphur of the matte at the surface of the bath where the metal is splashed and sprayed into the gas space above by the air bubbling from the primary air from the tuyères below the surface of the bath. The quantity of high-pressure air per unit of matte converted to be supplied through the tuyères can therefore be greatly reduced, with consequent reduction in the cost of power for the primary air compressors and the number of tuyères may be reduced.

Further, secondary low-pressure air may be supplied in excess of that required for combination with the sulphur, so as to exert a cooling action on the surface of the bath and the exposed walls of the converter, and thereby control the temperature thereof.

Other features of the invention are described hereinafter.

Existing converters can readily be provided with secondary air supply apparatus, so as to be worked in accordance with the present invention. With this end in view the invention comprises secondary air supply means fixedly mounted on the converter, said means comprising a fan, a motor coupled to said fan, and air piping connecting the outlet of said fan to the gas space in the interior of the converter.

Drawing is appended illustrating by way of example certain apparatus embodying features of the invention and capable of use in carrying the process of the invention into effect.

Figure 1 is a side elevation, partly broken away of a cylinder tilting converter in which the secondary air is distributed through tuyères along the whole length of the converters, the tilting gear being omitted, and some parts being only partially shown.

Figure 2 is a transverse section at the plane A—A of Figure 1.

Figures 3 and 4 refer to an arrangement in which the secondary air is delivered into the converter at the ends thereof, Figure 3 being a longitudinal section, and Figure 4 a fragmentary end elevation.

The converter illustrated is of the well-known cylindrical type comprising a steel shell 10 with tread-rings 11 resting on rollers 12, and tilting gear (not shown) whereby it can be rotated about its axis from its working position, as shown in the drawing, through an angle sufficient to bring its spout 13 into the position for charging and discharging. It comprises also a refractory lining 14, a gas outlet 15, and a stationary hood 16 above said outlet leading to a flue 17 for the outlet gases. The usual air supply means are shown in Figures 1 and 2, but are omitted from Figures 3 and 4. These comprise an upright air main 18 in fixed relationship to the foundations and terminating in an angle pipe 19 provided with a gland 20 bored co-axial with the cylindrical shell 10. The bustle pipe 21 fixed to the cylindrical shell 10 is connected to the air main 18 by way of the radial pipe 22 and through the gland 20 in a manner well known. The tuyères 24 are connected to the bustle pipe in manner well known also, so that these parts and connections need not here be described in detail. It will suffice for the purpose of describing the present invention to observe that the discharge mouths 25 of the tuyères are below the normal surface level 26 of the molten material in the converter. Said surface level is shown in Figure 3 as being at the axis of the converter.

The secondary air supply means shown in Figures 1 and 2 comprises a secondary bustle pipe 28 fixed to and extending along the whole length of the shell 10 of the converter, secondary tuyères 29 connected by flexible piping 30 to the bustle pipe 28 and having their discharge mouths 31 immediately above the level 26 of the molten material, a fan 32 preferably of the axial flow type, a throttle valve 33 between the fan and the bustle pipe, and an electric motor (not shown) direct-coupled to the fan. Flexible conductors connect the terminals of the motor to the power supply mains. The arrangement is extremely simple, the whole apparatus being in fixed relationship to the converter, the only relative motion during tilting of the converter being the flexing of the electrical conductors of the motor.

The fan 32 has no static pressure to overcome, the only resistance to the flow of the secondary air being frictional. Consequently, the pressure head to be developed by the fan is small, of the order of a few ounces per square inch, and the power required to drive it is relatively small.

The secondary air supplies an important portion of the oxygen required for combination with the sulphur of the copper matte. Such combination is practically instantaneous. In my arrangement of a converter one important function of the primary air is to keep the molten matte in a state of violent agitation, so as to present large surfaces thereof for contact with the secondary air.

In the secondary air supply means shown in Figures 3 and 4, the air is delivered by a fan 32ᵃ and a short pipe connection 28ᵃ at each end of the converter into the top thereof. With this arrangement the resistance to the flow of air is smaller than with the arrangement shown in Figures 1 and 2, and the power required is therefore less. The numerals in Figs. 3 and 4 denote parts corresponding in function to the parts designated by the similar numerals in Figs. 1 and 2 without the letter $a$.

As has already been stated, the combination of the sulphur of the matte with the oxygen produces heat, which has to be dissipated, otherwise the temperature would become excessive, with consequent risk of damage to the refractory lining and the tuyères. Hitherto, the excess heat has been dissipated by stopping the supply of air to the tuyères, allowing the converter to cool by external radiation and by charging cold material into the converter. With the present invention, the temperature of the interior of the converter can be reduced by supplying more secondary air than the oxygen of which will be utilized, or by turning the converter off its tuyères, thus stopping the primary air supply at intervals. The secondary air supply being maintained during such intervals has a cooling effect, so that the temperature can easily be kept within predetermined limits. Again, the supplies of both primary and secondary air may be kept constant, the secondary air supply being in excess of that required to satisfy the demand for oxygen by the sulphur and iron of the bath exposed to its action, the excess air carrying off heat generated by the oxidation of the sulphur and iron. The volume of flow of secondary air may be controlled by means of the throttle valve 33, or by varying the speed of the fan and its motor. By this method, the time required for the conversion of a charge is considerably reduced.

It will be understood the secondary air could be delivered to the interior of the converter from a stationary fan through flexible or swivel pipe connections instead of by a fan mounted directly on the shell of the tilting converter.

My present invention can be applied not only to converters of the usual type, which are initially charged with molten matte, but also with furnace-converters having fuel burners, as described in my pending application, Serial No. 336,288 in which the copper sulphide ore is smelted and converted in one and the same furnace-converter.

I claim:—

1. The process of bessemerizing a copper matte, which consists in blowing high-pressure air intermittently into the material below the surface level thereof and blowing low-pressure air continuously into the gas space above said level, whereby the temperature of the material may be maintained within predetermined limits.

2. The process of converting a copper-containing matte to one of more concentrated metal content, which consists in blowing high-pressure air continuously into the material below the surface level thereof and simultaneously blowing an excess of low-pressure air into the gas space above said level, whereby the temperature of the material may be maintained within predetermined limits.

3. The process of bessemerizing a copper matte which consists in blowing air at relatively high pressure into the matte below the surface level thereof and simultaneously blowing air in excess of the rate at which it is taken up in combination with the sulphur into the gas space above said level for the purpose of abstracting heat from the bath and furnace.

4. The process of bessemerizing a copper matte which consists in introducing it in the form of matte into a bessemerizing chamber, agitating and oxidizing the metal by the introduction of high pressure air into the matte below the surface level thereof and simultaneously controlling the temperature by the introduction of excess air above the surface level of the metal.

In testimony whereof I affix my signature.

ALEXANDER GRANT McGREGOR.